United States Patent Office 3,514,478
Patented May 26, 1970

3,514,478
PRODUCTION OF AROMATIC NITRILES FROM N-FORMYLATED PRIMARY AMINO COMPOUNDS IN CONTACT WITH A SILICATE CATALYST
Friedrich Becke, Heidelberg, and Josef Gnad, Ludwigshafen (Rhine), Germany, assignors to Badische Anilin- & Soda-Fabrik Aktiengesellschaft, Ludwigshafen (Rhine), Germany
No Drawing. Filed Sept. 11, 1967, Ser. No. 666,960
Claims priority, application Germany, Sept. 15, 1966, 1,286,001
Int. Cl. C07c $121/02$
U.S. Cl. 260—465  5 Claims

ABSTRACT OF THE DISCLOSURE

Production of nitriles by contacting an N-formylated primary aromatic monoamine with a catalyst at elevated temperature wherein said N-formylated monoamine is dissolved in a 2–4 carbon aliphatic nitrile, a 7–9 carbon benzene carboxylic acid nitrile, a formyl compound of a 1–3 carbon primary alkylamine or a formyl compound of a 6–8 carbon primary aromatic monoamine, and supplying the solution to the catalyst zone.

---

This invention relates to the production of organic substances. More particularly it relates to the production of nitriles of aromatic carboxylic acids.

It is known from German patent specification No. 482,-943 that carboxylic acid nitriles are obtained when the vapor of a primary amine formate is passed at elevated temperature over highly porous catalysts, such as silicic acid gel, active carbon or alumina. The reaction proceeds by way of the N-formyl compound. The expected isonitrile is not however formed but, owing to rearrangement, a nitrile which contains one more carbon atom than the amine used. The yields and particularly the conversions in this method are unsatisfactory. Another disadvantage of the method consists in the fact that the catalysts are not suitable for sustained operation. Their activity is in fact completely lost after a few hours. It is known from U.S. Pat. No. 3,256,311 that when a realtively wide pored catalyst is used, the desired carboxylic acid nitrile is always obtained in higher yields with higher conversions. Moreover the catalyst described therein has a long life. When using starting materials of high melting point, for example N-formyl compounds of xylidines or halogen-substituted anilines, difficulties are encountered as regards metering of the feed and resinification in the catalyst zone. The difficulties are even more serious when the nitrile is to be manufactured on a large scale and the formyl compounds have to be pumped into the reactor. Crystallization results in stoppages in the pipelines or trouble with the pumps.

It is an object of the present invention to provide a process for the production of aromatic carboxylic acid nitriles which gives high yields of products that may serve as intermediates without further purification.

Another object is to provide a process in which solvents or diluents are used that enable the reaction to proceed smoothly.

Still another object is to provide a process which offers no problems regarding metering of the feed or crystallization of the product.

In accordance with this invention these and other objects and advantages are achieved by a process for the production of aromatic carboxylic acid nitriles by contacting an N-formylated primary aromatic monoamine having a melting point above 80° C. with a wide pored catalyst at elevated temperature wherein the improvement comprises dissolving said monoamine in a fatty acid nitrile having two to four carbon atoms, a benzenecarboxylic acid nitrile having seven to nine carbon atoms, a formyl compound of a primary alkylamine having one to three carbon atoms or a formyl compound of a primary aromatic monoamine having six to eight carbon atoms (which is different from the formyl compound to be reacted) and supplying the resultant solution to the catalyst zone.

High melting point formyl compounds of primary aromatic monoamines, such as a dialkylaniline, a dihaloaniline or an aniline which bears a lower alkyl group and a halogen atoms as substituents, are used as starting materials. For example the formyl compounds of 2,3-dimethylaniline, 2,4-dimethylaniline, 2,5-dimethylaniline, 3,5-dimethylaniline, 3,5-dichloroaniline, 2,6-dichloroaniline, 2-methyl-3-chloroaniline, 2-methyl-4-chloroaniline, 2-chloro-4-methylaniline or 3-chloro-4-methylaniline, may be used.

Fatty acid nitriles having two to four carbon atoms or benzene carboxylic acid nitriles having seven to nine carbon atoms may be used as solvents or diluents, for example acetonitrile, propionitrile, butyronitrile, benzonitrile, tolunitrile and preferably the nitriles to be prepared themselves. Furthermore the formyl compounds of alkylamines having one to three carbon atoms and of primary aromatic amines having six to eight carbon atoms may be used as solvents or diluents. Formyl compounds of amines such as methylamine, ethylamine, beta-methoxyethylamine, aniline, ortho-toluidine, metatoluidine and paratoluidine, are for example suitable as solvents. The solvents are used as a rule in amounts of 10 to 40% by weight based on the starting material.

The catalysts used are preferably those known from the said U.S. Pat. No. 3,256,311. The process may be carried out in the manner described in the said patent specification while maintaining the temperatures and residence times specified therein. The process may be carried out continuously or batchwise and in a stationary or fluidized bed or in the presence of an inert gas such as nitrogen. The products obtainable according to the process are valuable intermediates, for example for the production of dyes or biocides.

The aforesaid catalysts are active silicic acid gels (so-called silica gels) or silicates having more than 50% of pores of a radius of 10 to 200 A., the mean pore radius ranging between 20 and 100 A., and an internal surface of less than 550 square meters per gram. The preferred catalysts are those which have more than 75% of pores of a radius of 12 to 100 A., a mean pore radius of 12 to 60 A., and an internal surface of less than 500 square meters per gram.

Suitable silicic acid gel catalysts are advantageously obtained by precipitation of silicic acid sols or silicate solutions by heating or by the addition of acids, by treatment of the gels with electrolytes and then drying.

The said catalysts which have relatively large pores combined with a small surface are especially obtained if, either before or during drying, the gels are treated with relatively strong alkaline agents. In this case the catalysts have an exchange acidity above pH 3. The best results are obtained with catalysts having exchange acidities of between pH 3 and pH 7. Catalysts having exchange acidities below pH 3 are rather small-pored and less useful. The term "exchange acidity" is meant to denote the pH-value set up by stirring 1 gram of the gel with 10 grams of an N/10 solution of potassium chloride for some time.

An earlier method for determining the pore radius distribution originates from Kubelka ("Kolloid-Zeitschrift" 55 (1931), p. 129). This method allows for determining the portion of the pores having a diameter of from 2 to 43 m$\mu$. This method, like the one described in J. Am. Chem. Soc. 73 (1951), p. 373, is suitable for the characterization of the catalyst, although less accurate than the latter. Thus a silica gel which by the more recent method was found to contain 90% of pores of a radius of from 10 to 200 A., was found to contain from 75 to 90% of pores with a diameter of from 2 to 43 mμ when applying the earlier method.

It has been found that not only silicic acid gel but also silicates hare highly effective catalysts provided they meet the requirements as regards pore radius distribution, mean pore radius and internal surfaces set forth above. Apparently, it is not important whether silicic acid is present in the form of silicic acid gel or combined with basic oxides, such as magnesium oxide, calcium oxide, aluminum oxide and iron oxide, to form silicates, as long as silicic acid gel and silicates exhibit the said physical properties. Suitable catalysts are, for example, natural or synthetic silicates containing essentially magnesium oxide, iron oxide and/or aluminum oxide as basic oxides (up to 40% by weight) and being known as bleaching earths. Such natural silicates are montmorillonite, tonsile, bentonite, and fuller's earth. Synthetic silicates of this type are prepared by joint precipitation of suitable salt solutions.

Catalysts with especially long life and giving especially high conversion rates are those which additionally contain a metal oxide, especially an oxide of a metal of groups III–A, IV–B, V–B and VI–B of the periodic system. A further effect of the addition of an oxide consists in the fact that in the reaction of N,N'-diformyldiamino compounds the relative proportions of the two possible reaction products, namely dinitrile and aminonitrile, can be varied and this is often desirable. A specially effective metal oxide is titanium oxide. Examples of other suitable metal oxides are aluminum oxide, zirconium dioxide, thorium dioxide, vanadium oxide, chromium oxide, molybdenum oxide and tungsten oxide. The proportion of the metal oxides lies as a rule between 0.1 and 10% by weight with reference to the catalyst.

The catalysts activated by metal oxides can be produced, for example, by joint precipitation or by subsequent application of the metal oxides to the catalysts, for example by soaking silica gel or silicates with solutions of metal salts decomposable by heating, drying the same and heating in a current of gas.

The catalyst can be regenerated by treating it with oxygen or an oxygen-containing gas at 450° to 700° C. It is advantageous, after four or five regenerations, to add a treatment with a dilute solution, especially an aqueous solution, of a volatile acid at room temperature or moderately elevated temperature, as for example 30° to 50° C. In this way the exchange acidity of the catalyst is again shifted into the optimum range. Suitable acids are for example formic acid, acetic acid and especially dilute hydrochloric acid, e.g., 2 to 20% aqueous hydrochloric acid.

A specific embodiment of such catalyst was described in Example 1 of the aforesaid U.S. Pat. No. 3,256,311. In this example, 200 g. of silica gel (90% of the pores with a radius between 10 and 200 A.; mean pore radius 48.9 A.; internal surface 314 m.²/g.) the exchange acidity of which lies at pH 5 to 6.6, is mixed with a solution of 5 g. of titanium tetrachloride in 100 g. of absolute alcohol. The mixture is allowed to stand in the air for one quarter of an hour and then 40 g. of water is added. The catalyst is heated for 10 hours at 300° C. in a current of ammonia prior to use.

The invention is illustrated by the following examples.

EXAMPLE 1

A vertical stainless steel tube having a length of 200 cm. and a width of 5 cm. is filled in the lower and upper thirds with clay rings and in the middle third with catalyst. Another tube of stainless steel having a length of 100 cm. and a width of 5 cm., which is filled with clay rings, is placed on the first tube to serve as a preheater for the product. Both tubes are heated externally so that the temperature in the preheater is from 450° to 500° C. and in the catalyst zone from 450° to 520° C. 75 liters per hour of nitrogen is passed downwardly into the reactor and at the same time 2 kg. per hour of a liquid mixture of 4 kg. of N-formyl-2,4-dimethylaniline and 1 kg. of benzonitrile is also pumped downwardly into the reactor. At a conversion of 93%, 61.5 kg. of 2,4-dimethylbenzonitrile having a boiling point of 114° C. at 20 mm. is obtained from 75 kg. of the formyl compound. Having regard to the 2,4-dimethylaniline recovered, this represents 98% of the theoretical yield. The added solvent is recovered almost quantitatively by distillation.

EXAMPLE 2

The reactor is a vertical quartz tube having a length of 100 cm. and a width of 5 cm. which is filled in the upper and lower thirds with glass rings and in the middle third with catalyst and which is heated externally. 200 ml. of a solution of 1.6 kg. of N-formylamino-4-chloroaniline in 0.4 kg. of benzonitrile and 25 liters of nitrogen are supplied to the tube per hour. The temperature in the catalyst zone is 480° to 500° C. The discharge from the reactor is heated at 100° C. with 800 g. of 89% aqueous formic acid at atmospheric pressure and the excess of formic acid is distilled off. The benzonitrile is then recovered under subatmospheric pressure. The fraction passing over between 100° and 125° C. at a pressure of 12 mm. is allowed to solidify and is recrystallized from ethanol. 1065 g. of 4-chlorobenzonitrile having a melting point of 92° C. is obtained. The conversion is 75%. 240 g. of unreacted N-formylamino-4-chloroaniline is recovered. The yield is 90% of the theoretical.

EXAMPLE 3

A mixture of 1400 g. of N-formyl-3-chloro-4-methylaniline and 600 g. of formanilide is reacted in the same apparatus as in Example 2. The reactor throughput is 100 g./hour, the temperature of the catalyst zone is 480° to 510° C. and the amount of nitrogen is 20 liters per hour. The reaction mixture is treated as described in Example 2 to formylate the reformed 3-chloro-4-methylaniline with formic acid. 939 g. of 3-chloro-4-methylbenzonitrile having a boiling point of 90° C. at 2 mm. is obtained. At a conversion of 75%, the yield of reacted starting material is 82%.

EXAMPLE 4

The reactor is a vertical quartz tube having a length of 100 cm. and a width of 5 cm. which is filled in the lower and upper thirds with glass rings and in the middle third with catalyst and which is heated externally. 200 ml. of a solution of 0.6 kg. of N-formylamino-2,6-dichloroaniline in 0.4 kg. of benzonitrile and 25 liters of nitrogen are supplied per hour continuously to the reactor. The temperature in the catalyst zone is 480° to 520° C. The product is worked up in the usual way. 790 g. of 2,6-dichlorobenzonitrile is obtained, equivalent to 87% of the theoretical yield with reference to reacted 2,6-dichloroformanilide.

We claim:

1. A process for production of aromatic carboxylic acid nitriles which comprises dissolving an N-monoformylated aromatic primary amine having a melting point above 80° C. in 10–40% by weight, based on said primary amine, of a solvent selected from the group consisting of a fatty acid nitrile having 2–4 carbon atoms, a benzene carboxylic acid nitrile having seven to nine carbon atoms, a monoformyl compound of a primary alkylamine having one to three carbon atoms or a monoformyl compound of a primary aromatic monoamine having six to eight carbon atoms, which latter formyl compound is different from said N-monoformylated aromatic primary amine, and supplying the resultant solution to a catalyst zone and therein converting said N-monoformylated aromatic primary amine to its corresponding nitrile at elevated temperature in the range of 450–520° C. in the presence of a catalyst selected from the group consisting of silica gel and an inorganic silicate containing up to 40% by weight of a basic oxide selected from the group consisting of magnesium oxide, calcium oxide, iron oxide, aluminum oxide and mixtures thereof, said catalyst having more than 50% of its pores with a radius ranging from 10 to 200 A., a mean pore radius within the range of 20 to 100 A. and an internal surface of less than 550 square meters per gram.

2. A process as claimed in claim 1 wherein said monoformylated aromatic primary amine is an N-monoformylated aniline bearing as ring substituents 1–2 chloro groups, two lower alkyl groups, or one chloro group and one lower alkyl group.

3. A process as claimed in claim 1 wherein said solvent is selected from the group consisting of acetonitrile, propionitrile, butyronitrile, benzonitrile, tolunitrile, a dimethylbenzonitrile, a dichlorobenzonitrile, a chloromethylbenzonitrile, and an N-monoformyl compound of methylamine, ethylamine, beta-methoxyethylamine, aniline, ortho-toluidine, meta-toluidine and para-toluidine.

4. A process as claimed in claim 1 wherein said catalyst contains 0.1–10% by weight of an oxide selected from the group consisting of aluminum oxide, titanium dioxide, zirconium dioxide, thorium dioxide, vanadium oxide, chromium oxide, molybdenum oxide and tungstic oxide.

5. A process as claimed in claim 1 wherein said catalyst contains 0.1–10% by weight of titanium dioxide.

References Cited
UNITED STATES PATENTS

| | | | |
|---|---|---|---|
| 2,904,579 | 9/1959 | Muench et al. | 260—465 |
| 3,256,311 | 6/1966 | Becke et al. | 260—465 |

FOREIGN PATENTS

| | | |
|---|---|---|
| 1,288,283 | 2/1962 | France. |

CHARLES B. PARKER, Primary Examiner

S. T. LAWRENCE III, Assistant Examiner